United States Patent
Sanghvi et al.

(10) Patent No.: US 9,973,754 B2
(45) Date of Patent: May 15, 2018

(54) LOW POWER ULTRA-HD VIDEO HARDWARE ENGINE

(71) Applicant: Texas Instruments Incorporated, Dallas, TX (US)

(72) Inventors: Hetul Sanghvi, Karnataka (IN); Mihir Narendra Mody, Karnataka (IN); Niraj Nandan, Karnataka (IN); Mahesh Madhukar Mehendale, Karnataka (IN); Subrangshu Das, Karnataka (IN); Dipan Kumar Mandal, Karnataka (IN); Pavan Venkata Shastry, Karnataka (IN)

(73) Assignee: Texas Instruments Incorporated, Dallas, TX (US)

(*) Notice: Subject to any disclaimer, the term of this patent is extended or adjusted under 35 U.S.C. 154(b) by 371 days.

(21) Appl. No.: 14/661,711

(22) Filed: Mar. 18, 2015

(65) Prior Publication Data

US 2015/0271494 A1  Sep. 24, 2015

(30) Foreign Application Priority Data

Mar. 18, 2014 (IN) .......................... 1406/CHE/2014

(51) Int. Cl.
*H04N 19/115* (2014.01)
*H04N 19/423* (2014.01)
*G06F 13/28* (2006.01)

(52) U.S. Cl.
CPC .......... *H04N 19/115* (2014.11); *G06F 13/28* (2013.01); *H04N 19/423* (2014.11)

(58) Field of Classification Search
CPC ..... H04N 19/115; H04N 19/423; G06F 13/28

USPC ...................................................... 375/240.02
See application file for complete search history.

(56) References Cited

U.S. PATENT DOCUMENTS

| 8,879,727 | B2* | 11/2014 | Taylor | ................. H04L 9/0618 380/255 |
| 2007/0286275 | A1* | 12/2007 | Kimura | ................. H04N 5/775 375/240.01 |
| 2011/0280307 | A1* | 11/2011 | MacInnis | ................. G06T 9/00 375/240.15 |

(Continued)

OTHER PUBLICATIONS

"ISO/IEC, 14496-2," Internal Standard, Information technology—Coding of audio-visual objects, Part 2: Visual, Reference No. ISO/IEC 14496-2:2001(E), 2001 (536 pages). See p. 128, after table, paragraph 5, sub-heading: gob_number.

(Continued)

*Primary Examiner* — Nguyen Truong
(74) *Attorney, Agent, or Firm* — William B. Kempler; Charles A. Brill; Frank D. Cimino

(57) ABSTRACT

A low power video hardware engine is disclosed. The video hardware engine includes a video hardware accelerator unit. A shared memory is coupled to the video hardware accelerator unit, and a scrambler is coupled to the shared memory. A vDMA (video direct memory access) engine is coupled to the scrambler, and an external memory is coupled to the vDMA engine. The scrambler receives an LCU (largest coding unit) from the vDMA engine. The LCU comprises N×N pixels, and the scrambler scrambles N×N pixels in the LCU to generate a plurality of blocks with M×M pixels. N and M are integers and M is less than N.

13 Claims, 6 Drawing Sheets

(56) References Cited

U.S. PATENT DOCUMENTS

Figure 2:
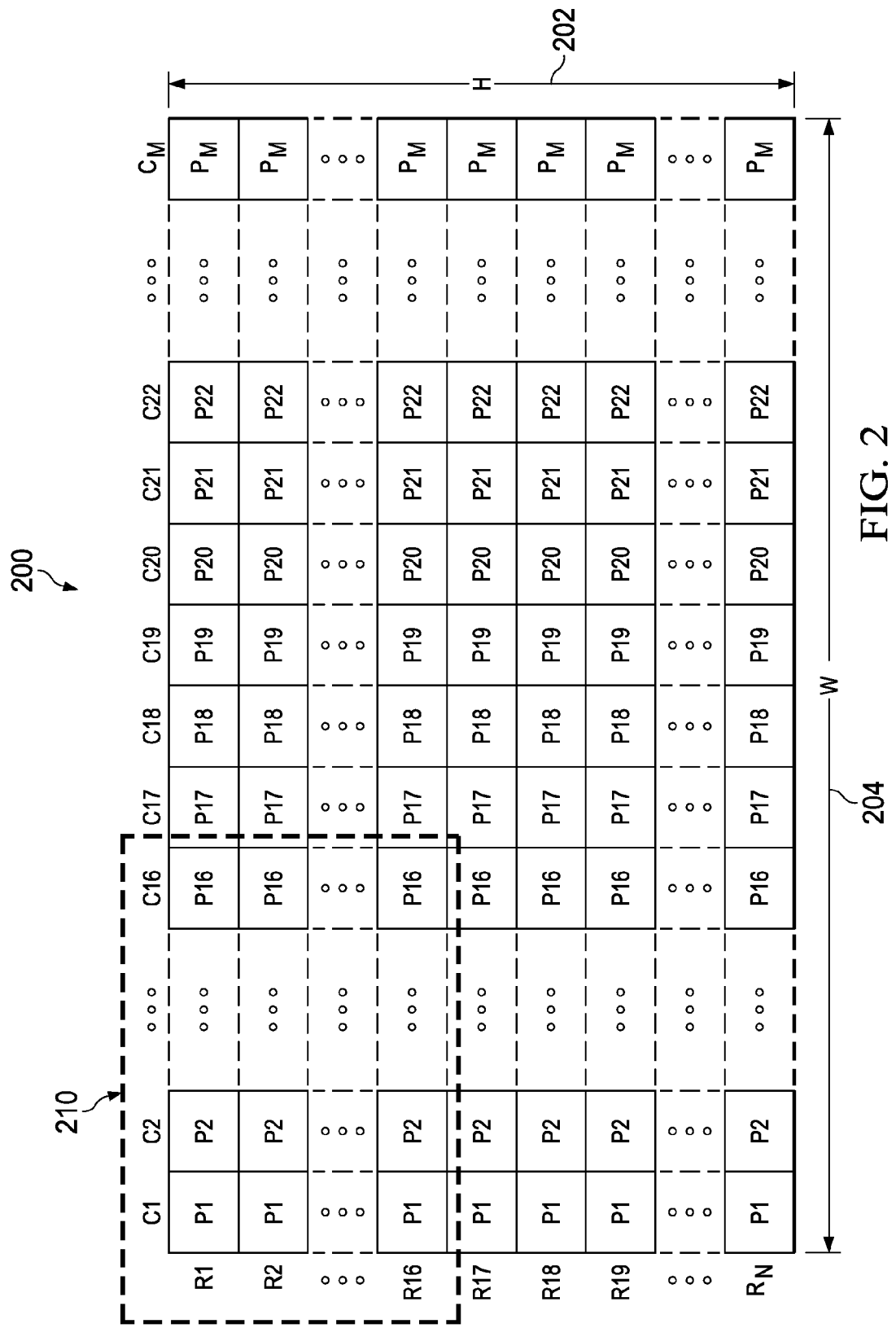

| | | | | |
|---|---|---|---|---|
| 2012/0128067 A1* | 5/2012 | Liu | ..................... | H04N 19/159 375/240.12 |
| 2013/0076770 A1* | 3/2013 | Cheng | ................... | H04N 19/13 345/547 |
| 2013/0343663 A1* | 12/2013 | Sato | ..................... | H04N 19/52 382/233 |

OTHER PUBLICATIONS

"ISO/IEC, 14496-2," Internal Standard, Information technology—Coding of audio-visual objects, Part 2: Visual, Reference No. ISO/IEC 14496-2:2001(E), 2001 (536 pages). See p. 131, sub-heading: piece_yoffset, paragraph 2.

"ISO/IEC, 14496-2," Internal Standard, Information technology—Coding of audio-visual objects, Part 2: Visual, Reference No. ISO/IEC 14496-2:2001(E), 2001 (536 pages). See p. 182, sub-heading: 7.5.2.5 Context based arithmetic decoding, paragraph 1.

"ISO/IEC, 14496-2," Internal Standard, Information technology—Coding of audio-visual objects, Part 2: Visual, Reference No. ISO/IEC 14496-2:2001(E), 2001 (536 pages). See p. 235, sub-heading: 7.8.3 Low-latency sprite reconstruction, paragraph 2.

"ISO/IEC, 14496-2," Internal Standard, Information technology—Coding of audio-visual objects, Part 2: Visual, Reference No. ISO/IEC 14496-2:2001(E), 2001 (536 pages). See p. 251, sub-heading: 7.10.1 Decoding of the DC subband, paragraph 2.

"ISO/IEC, 14496-2," Internal Standard, Information technology—Coding of audio-visual objects, Part 2: Visual, Reference No. ISO/IEC 14496-2:2001(E), 2001 (536 pages). See p. 254, sub-heading: 7.8.3.1 Decoding of holes in sprite object-piece, paragraph 1.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 8, sub-heading: 3.77 macroblock address, paragraph 1.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 9, sub-heading: 3.113 raster scan.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 11, sub-heading: 3.136 slice, paragraph 1.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 14, sub-heading: 5.7 Mathematical functions, equation (5-7).

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 24, sub-heading: 6.4.1 Inverse macroblock scanning process, equations (6-3), (6-4), (6-5) and (6-6).

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 25, sub-heading: 6.4.2.1 Inverse macroblock partition scanning process, equations (6-11), (6-12).

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 25, sub-heading: 6.4.2.2 Inverse sub-macroblock partition scanning process, equations (6-13), (6-14), (6-15), (6-16).

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 26, sub-heading: 6.4.3 Inverse 4×4 luma block scanning process, equations (6-17), (6-18).

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 29, sub-heading: 6.4.8.2 Derivation process for neighbouring 8×8 luma block, paragraph 2.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 30-31, sub-heading: 6.4.8.4 Derivation process for neighbouring 4×4 chroma blocks, equations (6-25), (6-26), (6-27), (6-28).

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 71, sub-heading: run_length_minus1[ i ], paragraph 1.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 71, sub-heading: top_left[ i ] and bottom_right[ i ], paragraph 1.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 71, sub-heading: slice_group_id[ i], paragraph 1.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 91, sub-heading: pcm_sample_luma [i], paragraph 1.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 91, sub-heading: pcm_sample_chroma[ i ], paragraph 1.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 102, sub-heading: 8.2.2 Decoding process for macroblock to slice group map, Table 8.1—Refined slice group map type.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264, Mar. 2005 (343 pages). See p. 105, sub-heading: 8.2.2.5 Specification for raster scan slice group map types.

"ITU-T," Telecommunication Standardization Sector of ITU, Series H: Audiovisual and Multimedia Systems, Infrastructure of audio-visual services—Coding of moving video, Advanced video coding for generic audiovisual services, ITU-T Recommendation H.264,

(56) References Cited

OTHER PUBLICATIONS

Mar. 2005 (343 pages). See p. 132, sub-heading: 8.3.4.1Specification of Intra_Chroma_DC prediction mode, equations (8-124), (8-125), (8-126), (8-127).

"ITU-T," Telecommunication Standardization Sector of ITU, Series H: Audiovisual and Multimedia Systems, Infrastructure of audiovisual services—Coding of moving video, Advanced video coding for generic audiovisual services, ITU-T Recommendation H.264, Mar. 2005 (343 pages). See p. 162, sub heading: 8.5.4 Specification of transform decoding process for chroma samples, paragraph 6(a) and equation (8-300).

"ITU-T," Telecommunication Standardization Sector of ITU, Series H: Audiovisual and Multimedia Systems, Infrastructure of audiovisual services—Coding of moving video, Advanced video coding for generic audiovisual services, ITU-T Recommendation H.264, Mar. 2005 (343 pages). See p. 163, section (d), equations (8-302), (8-303), (8-304), (8-305).

"ITU-T," Telecommunication Standardization Sector of ITU, Series H: Audiovisual and Multimedia Systems, Infrastructure of audiovisual services—Coding of moving video, Advanced video coding for generic audiovisual services, ITU-T Recommendation H.264, Mar. 2005 (343 pages). See p. 177, equations (8-412), (8-413), (8-414), (8-415).

"ITU-T," Telecommunication Standardization Sector of ITU, Series H: Audiovisual and Multimedia Systems, Infrastructure of audiovisual services—Coding of moving video, Advanced video coding for generic audiovisual services, ITU-T Recommendation H.264, Mar. 2005 (343 pages). See p. 179, sub-heading: 8.6.1.2 Chroma transform coefficient decoding process, equation (8-430).

"ITU-T," Telecommunication Standardization Sector of ITU, Series H: Audiovisual and Multimedia Systems, Infrastructure of audiovisual services—Coding of moving video, Advanced video coding for generic audiovisual services, ITU-T Recommendation H.264, Mar. 2005 (343 pages). See p. 180, equation (8-431).

"ITU-T," Telecommunication Standardization Sector of ITU, Series H: Audiovisual and Multimedia Systems, Infrastructure of audiovisual services—Coding of moving video, Advanced video coding for generic audiovisual services, ITU-T Recommendation H.264, Mar. 2005 (343 pages). See p. 293, sub-heading: spare_unit_flag, paragraph 1.

\* cited by examiner

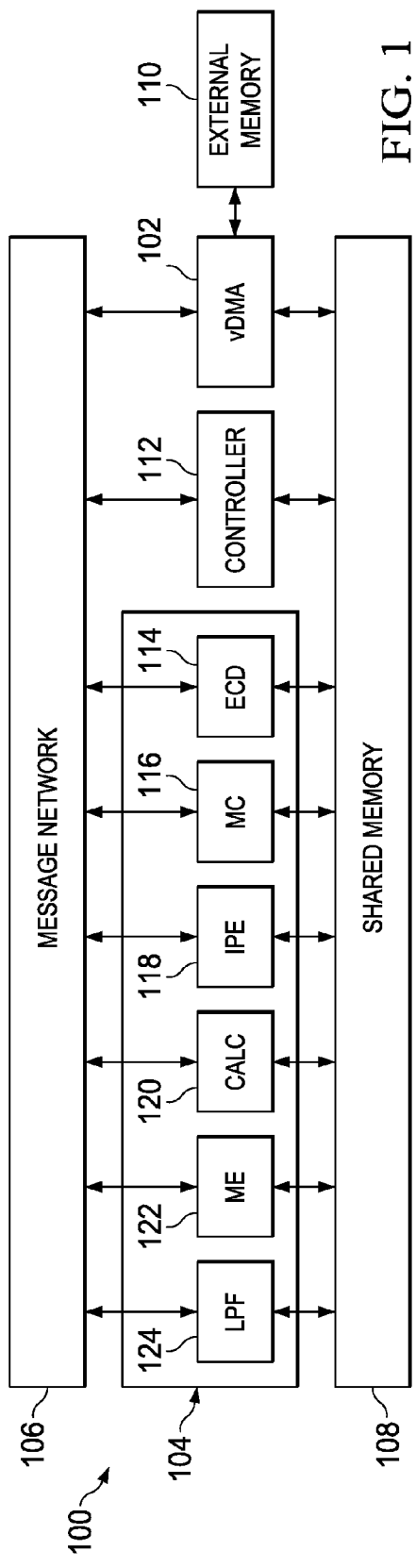
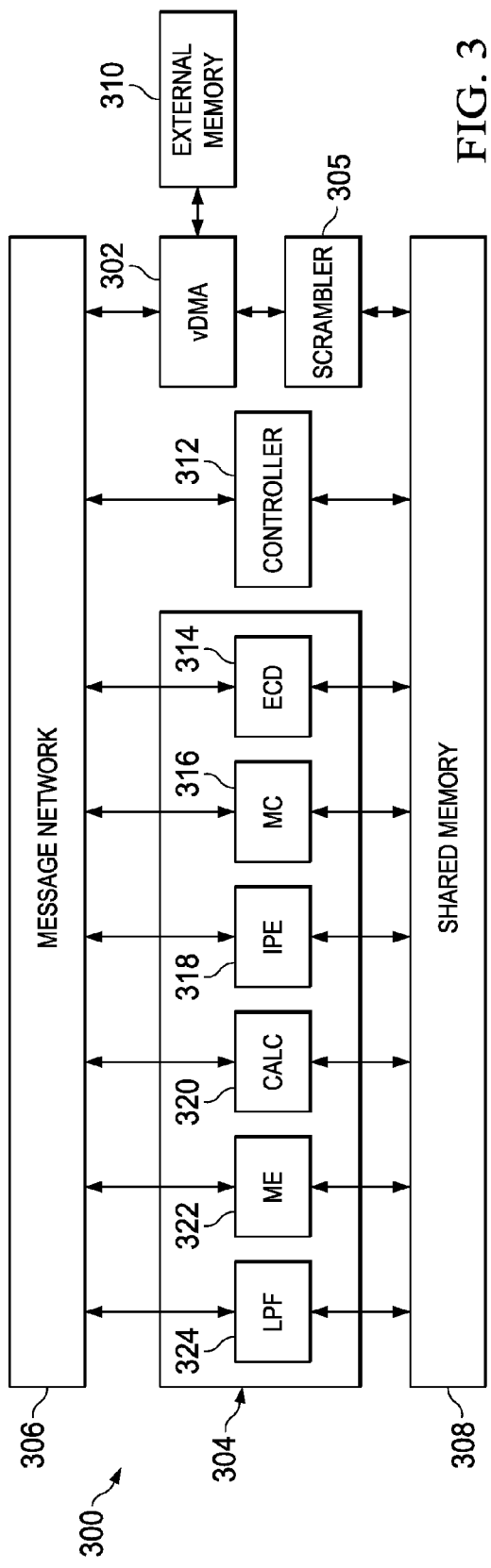

FIG. 4

LOW POWER ULTRA-HD VIDEO HARDWARE ENGINE

CROSS REFERENCES TO RELATED APPLICATIONS

This application claims priority from India provisional patent application No. 1406/CHE/2014 filed on Mar. 18, 2014, which is hereby incorporated by reference in its entirety.

TECHNICAL FIELD

The present disclosure is generally related to video coding and more particularly to techniques to enable a low power ultra-HD video hardware engine.

BACKGROUND

Video compression standards are becoming complex, starting from MPEG1/2 to the latest generation video standards HEVC (high efficiency video coding)/H.265. There is also scaling in resolution from High Definition (HD) to Ultra-HD (4K) resolution. This leads to increase of 4× complexity. This is further compounded by frame rate scaling from 30 to 60 fps (frame per second), which means an increase of 2× complexity.

Thus, a video hardware engine requires huge computation power that can be met by hardwired solution over fully programmable solutions. Multi-format support is another critical requirement in portable devices like smartphones and tablets. Thus, the solution also needs to cater to multiple format video standards such as MPEG1/2/4, H.261/3/4/5, RV8/9, AVS, and VP6/7/8. Based on actual application and market needs, the video hardware engine is configured for various formats by means of firmware.

Low power is another critical requirement in these mobile applications. The requirement becomes further stringent, as power and thermal radiation limits of consumer devices have been controlled by standards. Thus, a ultra-low power hardwired multi-format video hardware engine is required to cater 4K resolution and 60 fps.

SUMMARY

According to one aspect of the disclosure, a video hardware engine is disclosed. The video hardware engine includes a video hardware accelerator unit. A shared memory is coupled to the video hardware accelerator unit, and a scrambler is coupled to the shared memory. A vDMA (video direct memory access) engine is coupled to the scrambler, and an external memory is coupled to the vDMA engine. The scrambler receives an LCU (largest coding unit) from the vDMA engine. The LCU comprises N×N pixels, and the scrambler scrambles N×N pixels in the LCU to generate a plurality of blocks with M×M pixels. N and M are integers and M is less than N.

BRIEF DESCRIPTION OF THE VIEWS OF DRAWINGS

Figure 4:
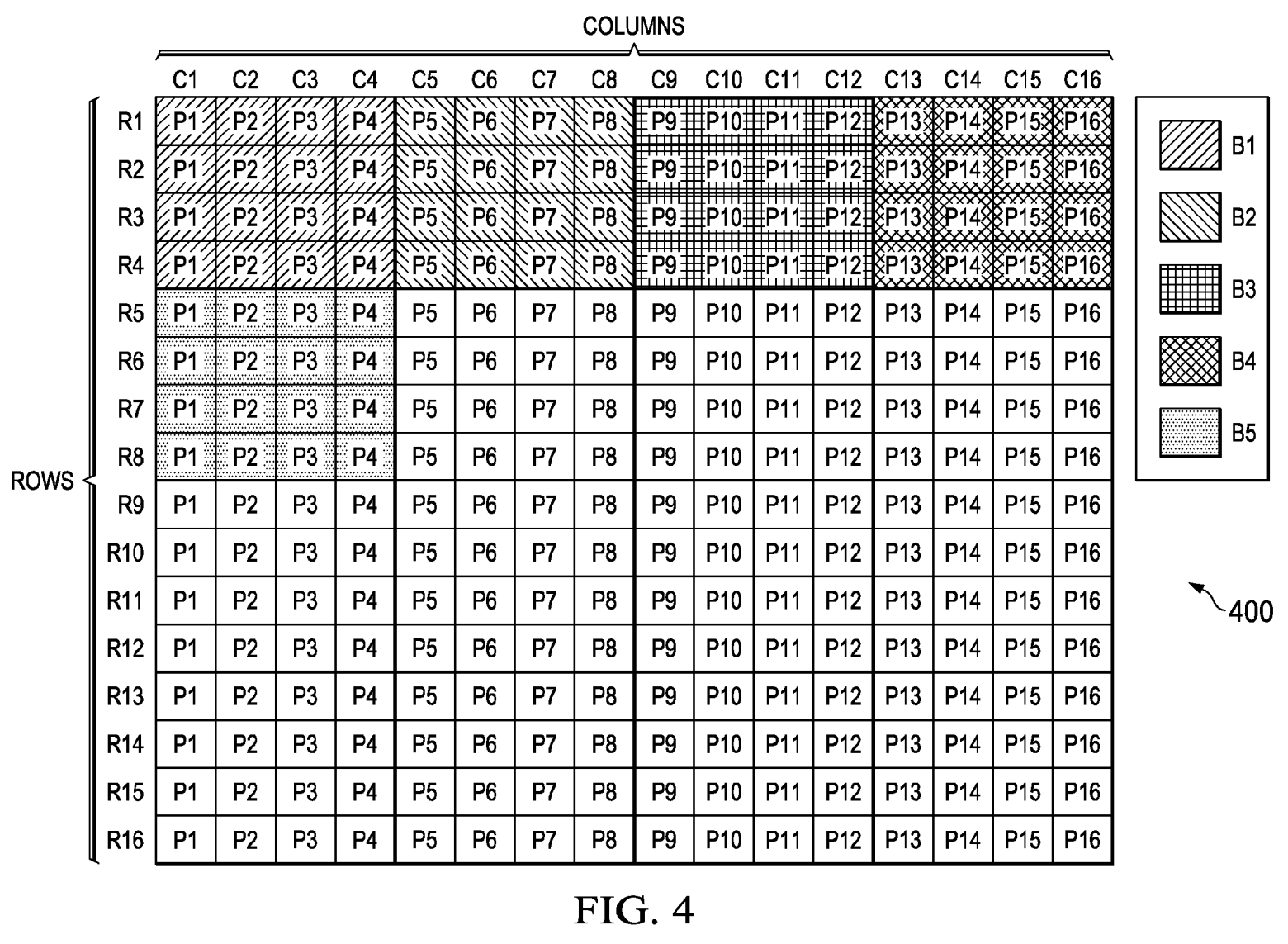
Figure 5:
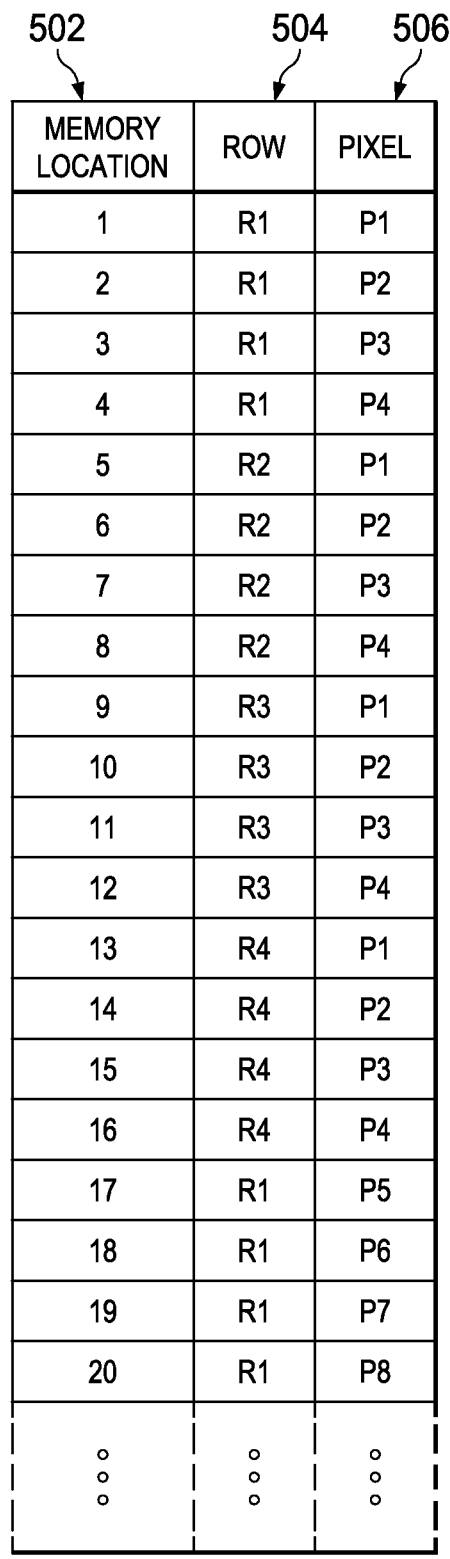
Figure 6:
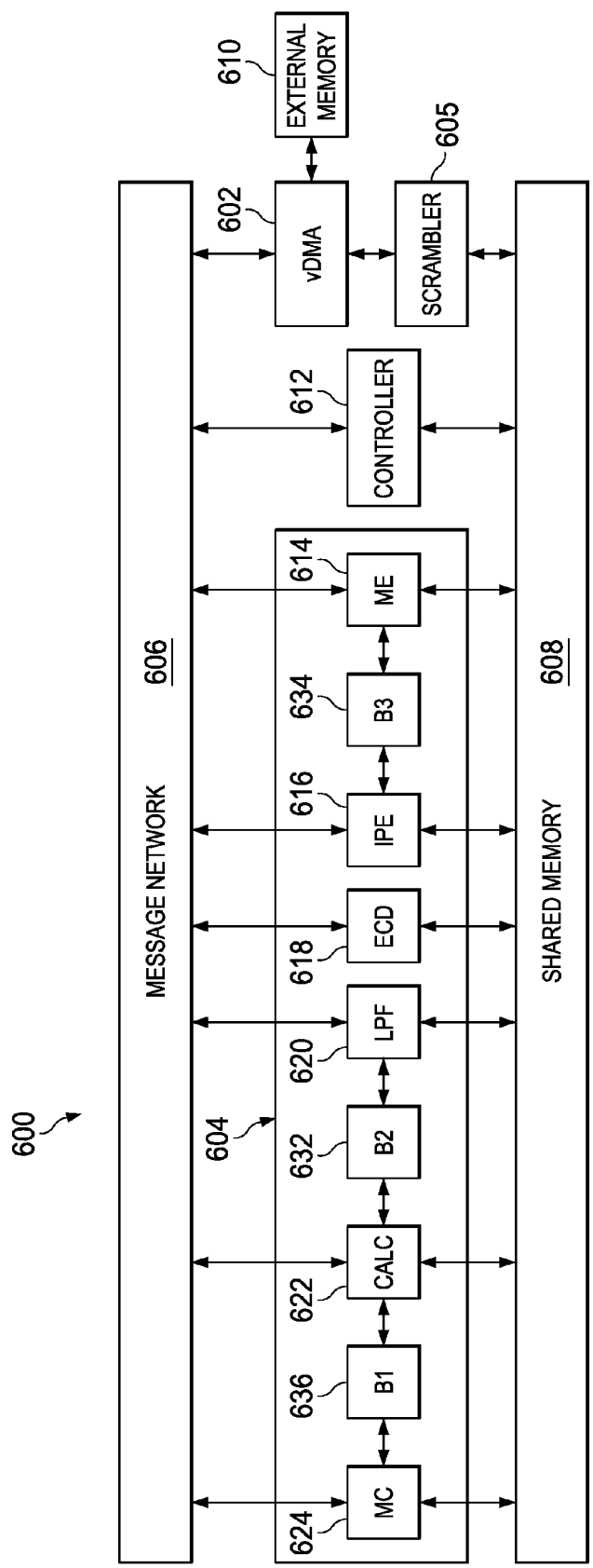
Figure 7:
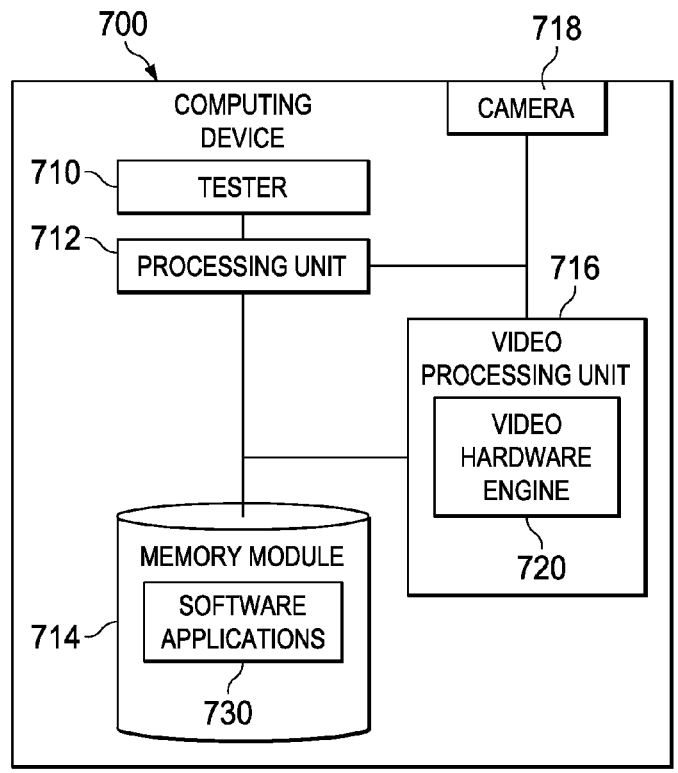
Figure 8:
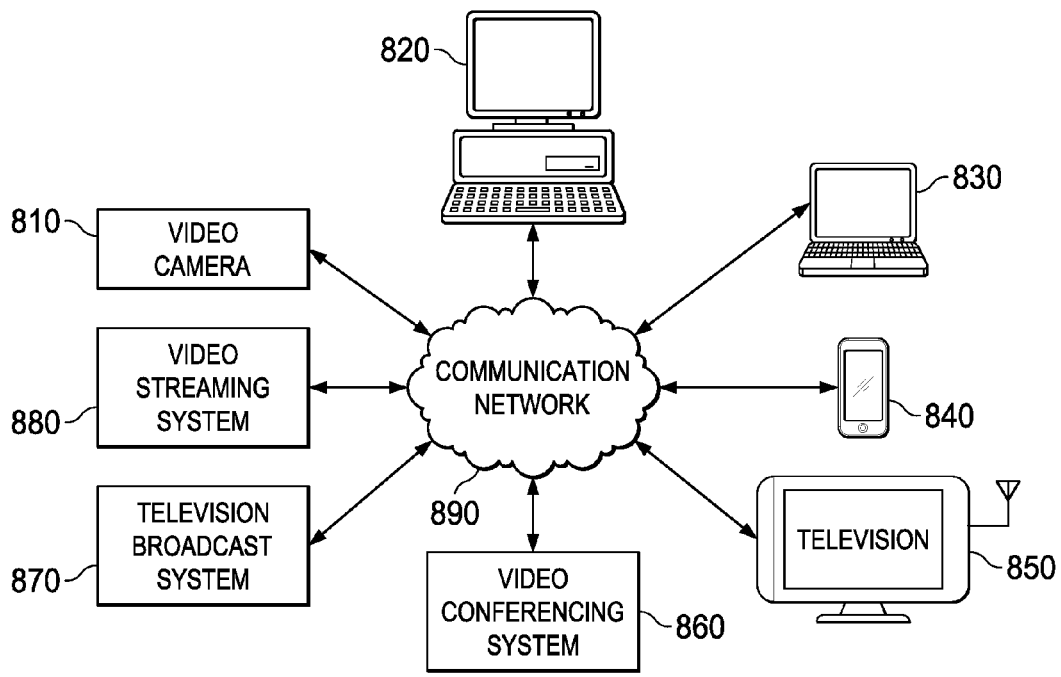

FIG. 1 is a block diagram of a video hardware engine;
FIG. 2 illustrates a frame received in a video hardware engine;
FIG. 3 is a block diagram illustrating a video hardware engine, according to an embodiment;
FIG. 4 is a block diagram illustrating a largest coding unit (LCU) to be processed in a video hardware engine, according to an embodiment;
FIG. 5 is a block diagram illustrating a storage format in a shared memory, according to an embodiment;
FIG. 6 is a block diagram illustrating a video hardware engine, according to an embodiment;
FIG. 7 is a block diagram illustrating a computing device according to an embodiment; and
FIG. 8 is an example environment in which various aspects of the present disclosure may be implemented.

DETAILED DESCRIPTION OF THE EMBODIMENTS

FIG. 1 is a block diagram of a video hardware engine 100. The video hardware engine 100 includes a controller 112, a vDMA (video direct memory access) engine 102 and a video hardware accelerator unit 104. In an example, the controller 112 is a low-end processing unit. The controller 112, the vDMA (video direct memory access) engine 102 and the video hardware accelerator unit 104 communicate through a message network 106. The controller 112, the vDMA engine 102 and the video hardware accelerator unit 104 use a shared memory 108.

The video hardware accelerator unit 104 includes hardware accelerator engines, which include the following, but not limited to, an entropy codec (ECD) engine 114, a motion compensation (MC) engine 116, a spatial intra prediction (IPE) engine 118, a transform and quantization (CALC) engine 120, a motion estimation (ME) engine 122 and a deblocking filter (LPF) engine 124.

In one version, the video hardware accelerator unit 104 includes a plurality of hardware accelerator engines. All the hardware accelerator engines in the video hardware accelerator unit 104 communicate with each other and with the controller 112 through the message network 106. The hardware accelerator engines are coupled to the shared memory 108 for exchange of data.

The vDMA engine 102 is coupled to an external memory 110. The external memory 110, in one example, is a DDR (double data rate) memory. The external memory 110 stores a plurality of frames corresponding to a video data. The external memory 110 in one version is embedded in the video hardware engine 100. In another version, the external memory 110 is not embedded in the video hardware engine 100. The video hardware engine 100 is one of the following, but not limited to, a multi-format video decoder, a multi-format video encoder and a multi-format encoder and decoder.

The multi-format encoder and decoder support functionality of both an encoder and a decoder. A multi-format video hardware engine supports various video formats such as, but not limited to, MPEG2, HEVC and H.264. The video hardware engine 100 may include one or more additional components known to those skilled in the relevant art and are not discussed here for simplicity of the description.

The operation of the video hardware engine 100 illustrated in FIG. 1 is explained now. The controller 112 is configured to operate in an encode mode and a decode mode. In encode mode, the controller 112 receives a plurality of frames and encode attributes associated with each frame of the plurality of frames, from a processing unit external to the video hardware engine 100. The video hardware engine 100 processes the plurality of frames and the encode attributes to generate a compressed bit-stream and an encode status. The controller 112 provides the compressed bit-stream and the encode status to the processing unit external to the video hardware engine 100.

In decode mode, the controller 112 receives a compressed bit-stream and decode attributes from the processing unit. The video hardware engine 100 processes the compressed bit-stream and the decode attributes to generate a plurality of frames and a decode status. The controller 112 provides the plurality of frames and the decode status to the processing unit.

The vDMA engine 102 directly provides the plurality of frames, encode attributes associated with each frame, the compressed bit-stream and decode attributes; from the shared memory 108 to the external memory 110 and vice-versa. The ME engine 122, during the encode mode, estimates motion information from a frame of the plurality of frames. The IPE engine 118, during the encode mode, generates a predicted frame for a current frame.

The CALC engine 120, during the encode mode, inversely quantizes the predicted frames and perform the inverse transformation on the result of inverse quantization. The CALC engine 120, during the decode mode, quantizes the compressed bit-stream and performs transformation on the result of quantization. The MC engine 116 performs motion compensation on the motion information associated with the frames/compressed bit-stream. The LPF engine 124 filters an output of the CALC engine 120 and is used for improving video quality.

The ECD engine 114, in encode mode, generates a preliminary compressed bit-stream and preliminary encode status. The preliminary compressed bit-stream and the preliminary encode status are further processed in the controller 112 to generate a compressed bit-stream and encode status. The ECD engine 114, in decode mode, generates a preliminary frame and a preliminary decode status. The preliminary frame and the preliminary decode status are further processed in the controller 112 to generate a frame and an encode status.

The controller 112 operates in the encode mode when the controller 112 receives a plurality of frames and encode attributes associated with each frame of the plurality of frames. The controller 112 also configures the video hardware accelerator unit 104 to process a frame based on the encode parameters associated with the frame. Each frame is further divided into rectangular blocks or LCUs (largest coding units) or macro-blocks of 16×16, 32×32 or 64×64. An optimal size of the LCU is selected based on the video content.

FIG. 2 illustrates a frame 200 received in a video hardware engine. In one version, a video is received at the video hardware engine, and the video contains a plurality of frame. The frame 200 is a frame of the plurality of frames. The frame 200 has a height H 202 and a width W 204. The frame 200 is an N×M frame i.e. the frame 200 has N rows and M columns. This also signifies that the frame 200 has M pixels in each row and N pixels in each column. In one example N is equal to M.

In one version, the frame 200 is a 3840×2160 frame. In another version, the frame 200 is a 1920×1080 frame. In frame 200, the rows are represented as R1, R2 to $R_N$, and the columns are represented as C1, C2 to $C_M$. Each row contains pixels which are represented as P1, P2 to $P_M$. The frame 200 has N such rows. An external memory, for example external memory 110 (illustrated in FIG. 1) stores a plurality of frame. The frame 200 is one frame of the plurality of frames.

The external memory 110 stores the frame 200 linearly. This implies that all the pixels in a first row (R1) are stored before storing all the pixels in a second row (R2). Thus, pixels P1, P2 to PM in the first row (R1) are stored followed by pixels P1, P2 to PM in the second row (R2).

The pixels are stored in consecutive memory locations of the external memory 110. For example, the pixel P1 in the first row (R1) is stored in a first memory location of the external memory 110, and the pixel P2 in the first row (R1) is stored in a second memory location of the external memory 110.

The video hardware engine, for example the video hardware engine 100 processes the frame 200 by dividing the frame rectangular blocks or LCUs (largest coding units) or macro-blocks of 16×16, 32×32 or 64×64. An optimal size of the LCU is selected based on the video content. The frame 200 has a plurality of LCUs and one such LCU is 210. The LCU 210 is a 16×16 LCU. Thus, the LCU 210 has 16 pixels in each row and 16 pixels in each column. Rows (R1 to R16) and columns (C1 to C16) represent the LCU 210.

A vDMA (video direct memory access) engine, for example the vDMA engine 102 accesses the frame 200 from external memory 110. The vDMA engine 102 loads all the pixels (P1, P2 to $P_M$) in the first row (R1) of the frame 200. However, the vDMA engine 102 stores only the pixels P1 to P16 in a shared memory, for example the shared memory 108, and discards the pixels P17 to $P_M$. Thereafter, the vDMA engine 102 loads all the pixels (P1, P2 to $P_M$) in the second row (R2) of the frame 200. However, the vDMA engine 102 stores only the pixels P1 to P16 in the shared memory 108, and discard the pixels P17 to $P_M$.

The vDMA engine 102 continues to load data to row R16. Thus, the vDMA engine 102 stores all the pixels in the LCU 210 in the shared memory 108 and discards all other pixels in rows R1 to R16. The vDMA engine 102 follows a raster scan order i.e. left-to-right and top-to-bottom. Thus, the vDMA engine 102 after storing the LCU 210 in the shared memory 108, stores a second LCU which is formed from the rows (R1 to R16) and columns (C17 to C32). After storing all the LCUs formed from pixels in the rows (R1 to R16), the vDMA engine 102 stores LCUs formed from pixels in the rows (R17 to R32).

The shared memory 108 stores the LCU 210 linearly. This implies that all the pixels (P1 to P16) in the first row (R1) of the LCU 210 are stored before storing all the pixels (P1 to P16) in the second row (R2). Thus, pixels P1, P2 to P16 in the first row (R1) are stored followed by pixels P1, P2 to P16 in the second row (R2).

The pixels are stored in consecutive memory locations of the shared memory 108. For example, the pixel P1 in the first row (R1) is stored in a first memory location of the shared memory 108, and the pixel P2 in the first row (R1) is stored in a second memory location of the shared memory 108.

When the vDMA engine 102 stores the LCU 210 in the shared memory 108, the video hardware accelerator unit 104 processes the LCU 210. However, this type of storage in the shared memory 108 is ineffective as the video hardware accelerator unit 104 requires only few pixels from each row during processing while discarding other pixels in these rows.

This leads to lower utilization of the video hardware accelerator unit 104 as most of the time of the video hardware accelerator unit 104 is involved in parsing the pixels stored in the shared memory 108. Thus, video hardware engine 100 is not as effective in applications which require higher visual quality and ultra-HD resolution.

FIG. 3 is a block diagram illustrating a video hardware engine 300, according to an embodiment. The video hardware engine 300 includes a controller 312, a vDMA (video direct memory access) engine 302 and a video hardware accelerator unit 304. In an example, the controller 312 is a low-end processing unit. In another example, the controller 312 is a RISC (reduced instruction set computing) processor. In yet another example, the video hardware engine 300 includes a plurality of controllers. The controller 312, the vDMA engine 302 and the video hardware accelerator unit 304 communicate through a message network 306.

The controller 312 utilizes the message network 306 for configuration and synchronization of the video hardware accelerator unit 304 and the vDMA engine 302. The vDMA engine 302 is coupled to a scrambler 305. The scrambler 305, the controller 312, and the video hardware accelerator unit 304 are coupled to a shared memory 308. In one example, the scrambler 305 is part of the vDMA engine 302. In another example, the scrambler 305 is part of the video hardware accelerator unit 304.

The video hardware accelerator unit 304 includes hardware accelerator engines, which include the following, but not limited to, an entropy codec (ECD) engine 314, a motion compensation (MC) engine 316, a spatial intra prediction (IPE) engine 318, a transform and quantization (CALC) engine 320, a motion estimation (ME) engine 322 and a deblocking filter (LPF) engine 324.

In one version, the video hardware accelerator unit 304 includes a plurality of hardware accelerator engines. All the hardware accelerator engines in the video hardware accelerator unit 304 communicate with each other and with the controller 312 through the message network 306. The hardware accelerator engines are coupled to the shared memory 308 for exchange of data. The shared memory 308 can be a memory such as (but not limited to) DDR (double data rate) memory, RAM (random access memory), flash memory, or disk storage.

The vDMA engine 302 is coupled to an external memory 310. The external memory 310, in one example, is a DDR (double data rate) memory. The external memory 310 stores a plurality of frames corresponding to a video data. The external memory 310 in one version is embedded in the video hardware engine 300. In another version, the external memory 310 is outside of the video hardware engine 300. The video hardware engine 300 is one of the following, but not limited to, a multi-format video decoder, a multi-format video encoder and a multi-format encoder and decoder.

The multi-format encoder and decoder support functionality of both an encoder and a decoder. A multi-format video hardware engine supports various video formats such as, but not limited to, MPEG2, HEVC and H.264. The video hardware engine 300 may include one or more additional components known to those skilled in the relevant art and are not discussed here for simplicity of the description.

The operation of the video hardware engine 300 illustrated in FIG. 3 is explained now. The controller 312 is configured to operate in an encode mode and a decode mode. In encode mode, the controller 312 receives a plurality of frames and encode attributes associated with each frame of the plurality of frames, from a processing unit external to the video hardware engine 300. The video hardware engine 300 processes the plurality of frames and the encode attributes to generate a compressed bit-stream and an encode status. The controller 312 provides the compressed bit-stream and the encode status to the processing unit external to the video hardware engine 300.

In decode mode, the controller 312 receives a compressed bit-stream and decode attributes from the processing unit. The video hardware engine 300 processes the compressed bit-stream and the decode attributes to generate a plurality of frames and a decode status. The controller 312 provides the plurality of frames and the decode status to the processing unit.

The operation of each of the hardware accelerator engines in the video hardware accelerator unit 304 is similar to the hardware accelerator engines in the video hardware accelerator unit 104, as described in connection with FIG. 1. Hence, the operation of these hardware accelerator engines is not repeated for brevity of the description.

The controller 312 operates in the encode mode when the controller 312 receives a plurality of frames and encode attributes associated with each frame of the plurality of frames. The controller 312 also configures the video hardware accelerator unit 304 to process a frame based on the encode parameters associated with the frame.

The video hardware engine 300 processes the frame by dividing the frame into rectangular blocks or LCUs (largest coding units) or macro-blocks of 16×16, 32×32 or 64×64. An optimal size of the LCU is selected based on the video content. In general, the video hardware engine 300 processes the frame by dividing the frame into LCUs of N×N pixels. The N×N pixels in the LCU are arranged in N rows and N columns.

For example, the video hardware engine 300 processes the frame 200 (illustrated in FIG. 2) by dividing the frame into LCUs of 16×16 pixels. An LCU of 16×16 pixels is used to explain the logical flow and for ease of understanding, and is understood not to limit the scope of the present disclosure.

The scrambler 305 receives the LCU with N×N pixels from the vDMA engine 302. The scrambler 305 scrambles N×N pixels in the LCU, and generates a plurality of blocks with M×M pixels. N and M are integers. In one version, M is less than N. The plurality of blocks includes a first block. The first block is generated by the scrambler 305 from pixels in first M rows and in first M columns of the LCU.

The plurality of blocks with M×M pixels are received from the scrambler 305 and stored in the shared memory 308. Also, the M×M pixels in first block are linearly stored in the shared memory 308. While storing the first block in the shared memory 308, the M pixels in a first row of the first block are stored followed by M pixels in a second row of the first block.

The shared memory 308 linearly stores a set of blocks of the plurality of blocks. The set of blocks is generated by the scrambler 305 from the first M rows of the LCU. The video hardware accelerator unit 304 accesses the shared memory 308 to process the plurality of blocks. The video hardware accelerator unit 304 processes the plurality of blocks to generate a plurality of processed blocks.

The plurality of processed blocks are stored in the shared memory 308. Each processed block of the plurality of processed blocks includes M×M pixels. The scrambler 305 receives the plurality of processed blocks from the shared memory 308. The scrambler 305 descrambles the plurality of processed blocks to generate a processed LCU with N×N pixels. The vDMA engine 302 provides the processed LCU to the external memory 310.

The scrambler 305 stores the plurality of blocks with M×M pixels in the shared memory. The video hardware accelerator unit 304 processes these blocks sequentially. The video hardware accelerator unit 304 loads the first block of the plurality of blocks for processing followed by loading a second block of the plurality of blocks for processing.

The video hardware accelerator unit 304 is not required to parse the pixels stored in the shared memory 308. This provides efficient utilization of the video hardware accelerator unit 304. The video hardware engine 300 thus is able to provide 4K (ultra high-definition (HD)) resolution due to better utilization of the video hardware accelerator unit 304. Thus, video hardware engine 300 can be used in applications requiring high resolution such as cell phones, broadcast, set-top box, video conferencing, video surveillance, automotive etc. The operation of the video hardware engine 300 is further explained in connection with FIG. 4.

FIG. 4 is a block diagram illustrating a largest coding unit (LCU) 400 to be processed in a video hardware engine, according to an embodiment. The LCU 400 is contained in a video data which is received by the video hardware engine 300. The video data includes a plurality of frames, and each frame includes a plurality of LCUs. The LCU 400 is one LCU of the plurality of LCUs. The LCU 400 of 16×16 pixels is used to explain the logical flow according to an embodiment and is understood not to limit the scope of the present disclosure.

The operation of the video hardware engine 300 is now explained in connection with the LCU 400. The LCU 400 is a 16×16 LCU i.e. 16 pixels in each row and 16 pixels in each column. Rows (R1 to R16) and columns (C1 to C16) represent the LCU 400. The 16×16 pixels in the LCU 400 are arranged in 16 rows (R1 to R16) and 16 columns (C1 to C16).

The scrambler 305 receives the LCU 400 with 16×16 pixels from the vDMA engine 302. The scrambler 305 scrambles the 16×16 pixels in the LCU 400, and generates a plurality of blocks with 4×4 pixels. Thus, the scrambler 305 generates 16 blocks with 4×4 pixels. The plurality of blocks are represented as a first block B1, a second block B2, a third block B3, a fourth block B4 and a fifth block B5. Only 5 blocks have been illustrated in FIG. 4 for the purposes of explanation and it is understood that the LCU 400 includes 16 blocks and a last block would be formed from pixels in the rows R13 to R16 and columns C13 to C16.

In one version, the scrambler generates blocks with 8×8 pixels. The first block B1 is generated by the scrambler 305 from pixels in the first 4 rows (R1 to R4) and in the first 4 columns (C1 to C4) of the LCU 400. The plurality of blocks with 4×4 pixels are received from the scrambler 305 and stored in the shared memory 308.

The 4×4 pixels in the first block B1 are linearly stored in the shared memory 308. While storing the first block B1 in the shared memory 308, the 4 pixels in a first row (R1) are stored followed by storing 4 pixels in a second row (R2) of the first block B1. Thus, the pixels P1 to P4 in the first row (R1) are stored before storing the pixels P1 to P4 in the second row (R2).

The pixels are stored in consecutive memory locations of the shared memory 308. For example, the pixel P1 in the first row (R1) is stored in a first memory location of the shared memory 308, and the pixel P2 in the first row (R1) is stored in a second memory location of the shared memory 308.

The shared memory 308 linearly stores a set of blocks of the plurality of blocks. The set of blocks include the first block B1, the second block B2, the third block B3 and the fourth block B4. The set of blocks is generated by the scrambler 305 from the first 4 rows of the LCU 400. The shared memory 308 linearly stores these set of blocks i.e. the first block B1 is stored followed by storing the second block B2, followed by storing the third block B3 and then the fourth block B4 is stored in the shared memory 308.

The video hardware accelerator unit 304 accesses the shared memory 308 to process the plurality of blocks. The video hardware accelerator unit 304 processes the plurality of blocks to generate a plurality of processed blocks. The plurality of processed blocks are stored in the shared memory 308. Each processed block of the plurality of processed blocks includes 4×4 pixels.

The scrambler 305 receives the plurality of processed blocks from the shared memory 308. The scrambler 305 descrambles the plurality of processed blocks to generate a processed LCU with 16×16 pixels. The vDMA engine 302 provides the processed LCU to the external memory 310.

The scrambler 305 stores the plurality of blocks with 4×4 pixels in the shared memory. The video hardware accelerator unit 304 processes these blocks sequentially. The video hardware accelerator unit 304 loads the first block B1 of the plurality of blocks for processing followed by loading the second block B2 of the plurality of blocks for processing. The video hardware accelerator unit 304 is not required to parse the pixels stored in the shared memory 308.

This provides efficient utilization of the video hardware accelerator unit 304. The video hardware engine 300 thus is able to provide 4 K (ultra high-definition (HD)) resolution due to better utilization of the video hardware accelerator unit 304. Thus, video hardware engine 300 can be used in applications requiring high resolution such as cell phones, broadcast, set-top box, video conferencing, video surveillance, automotive etc.

FIG. 5 is a block diagram illustrating a storage format in a shared memory, according to an embodiment. The figure is explained in connection with the video hardware engine 300 (illustrated in FIG. 3) and the LCU 400 processed in the video hardware engine 300. A column 502 illustrates a memory location, a column 504 illustrates a row and a column 506 illustrates a pixel. For example, at memory location 1, a pixel P1 in row R1 is stored. Similarly, at memory location 7, a pixel P3 in row R2 is stored.

The scrambler 305 receives the LCU 400 with 16×16 pixels from the vDMA engine 302. The scrambler 305 scrambles the 16×16 pixels in the LCU 400, and generates a plurality of blocks with 4×4 pixels. Thus, the scrambler 305 generates 16 blocks with 4×4 pixels.

The 4×4 pixels in the first block B1 are linearly stored in the shared memory 308. While storing the first block B1 in the shared memory 308, the 4 pixels in a first row (R1) are stored followed by storing 4 pixels in a second row (R2) of the first block B1. Thus, the pixels P1 to P4 in the first row (R1) are stored before storing the pixels P1 to P4 in the second row (R2).

As illustrated in FIG. 5, the pixels P1 to P4 in the first row (R1) are stored in memory locations 1 to 4 of the shared memory 308. Thereafter, the pixels P1 to P4 in the second row (R2) are stored in the memory locations 5 to 8.

The pixels are stored in consecutive memory locations of the shared memory 308. For example, the pixel P1 in the first row (R1) is stored in a first memory location (1) of the shared memory 308, and the pixel P2 in the first row (R1) is stored in a second memory location (2) of the shared memory 308.

The shared memory 308 linearly stores a set of blocks of the plurality of blocks. Thus, the first block B1 is stored followed by storing the second block B2. As illustrated, all the pixels in the first block B1 are stored in the memory locations 1 to 16. Thereafter, from memory location 17, the pixels in the second block B2 are stored. Similarly, the fourth block B4 is stored in the shared memory 308 followed by storing the fifth block B5.

FIG. 6 is a block diagram illustrating a video hardware engine 600, according to an embodiment. The video hardware engine 600 includes a controller 612, a vDMA (video direct memory access) engine 602 and a video hardware accelerator unit 604. In an example, the controller 612 is a low-end processing unit. In another example, the controller 612 is a RISC (reduced instruction set computing) processor. In yet another example, the video hardware engine 600 includes a plurality of controllers. The controller 612, the vDMA engine 602, and the video hardware accelerator unit 604 communicate through a message network 606. The controller 612 utilizes the message network 606 for configuration and synchronization of the video hardware accelerator unit 6 and the vDMA engine 602. The vDMA engine 602 is coupled to a scrambler 605. The scrambler 605, the controller 612 and the video hardware accelerator unit 604 are coupled to a shared memory 608.

The video hardware accelerator unit 604 includes hardware accelerator engines, which include the following, but not limited to, a motion estimation (ME) engine 614, a spatial intra prediction (IPE) engine 616, an entropy codec (ECD) engine 618, a deblocking filter (LPF) engine 620, a transform and quantization (CALC) engine 622, and a motion compensation (MC) engine 624.

The video hardware accelerator unit 604 includes a first dedicated buffer B1 636, a second dedicated buffer B2 632 and a third dedicated buffer B3 634. The first dedicated buffer B1 636 is coupled between the motion compensation (MC) engine 624 and the transform and quantization (CALC) engine 622. The second dedicated buffer B2 632 is coupled between the transform and quantization (CALC) engine 622 and the deblocking filter (LPF) engine 620.

The third dedicated buffer B3 634 is coupled between the spatial intra prediction (IPE) engine 616 and the motion estimation (ME) engine 614. In one version, the video hardware accelerator unit 604 includes one or more hardware accelerator engines. In another version, the video hardware accelerator unit 604 includes a plurality of hardware accelerator engines. In yet another version, the video hardware accelerator unit 604 includes at least one dedicated buffer coupled between a first and a second hardware accelerator engine. The one or more hardware accelerator engines include the first and the second hardware accelerator engine. An output of the first hardware accelerator engine is directly provided as an input to the second hardware accelerator engine through a dedicated buffer.

All the hardware accelerator engines in the video hardware accelerator unit 604 communicate with each other and with the controller 612 through the message network 606. The hardware accelerator engines are coupled to the shared memory 608 for exchange of data. The shared memory 608 can be a memory such as (but not limited to) DDR (double data rate) memory, RAM (random access memory), flash memory, or disk storage.

The vDMA engine 602 is coupled to an external memory 610. The external memory 610, in one example, is a DDR (double data rate) memory. The external memory 610 stores a plurality of frames corresponding to a video data. The external memory 610 in one version is embedded in the video hardware engine 600. In another version, the external memory 610 is outside of the video hardware engine 600. The video hardware engine 600 is one of the following, but not limited to, a multi-format video decoder, a multi-format video encoder and a multi-format encoder and decoder.

The multi-format encoder and decoder support functionality of both an encoder and a decoder. A multi-format video hardware engine supports various video formats such as, but not limited to, MPEG2, HEVC and H.264. The video hardware engine 600 may include one or more additional components known to those skilled in the relevant art and are not discussed here for simplicity of the description.

The operation of the video hardware engine 600 illustrated in FIG. 6 is explained now. The controller 612 is configured to operate in an encode mode and a decode mode. In encode mode, the controller 612 receives a plurality of frames and encode attributes associated with each frame of the plurality of frames, from a processing unit external to the video hardware engine 600. The video hardware engine 600 processes the plurality of frames and the encode attributes to generate a compressed bit-stream and an encode status. The controller 612 provides the compressed bit-stream and the encode status to the processing unit external to the video hardware engine 600.

In decode mode, the controller 612 receives a compressed bit-stream and decode attributes from the processing unit. The video hardware engine 600 processes the compressed bit-stream and the decode attributes to generate a plurality of frames and a decode status. The controller 612 provides the plurality of frames and the decode status to the processing unit.

The MC engine 624 performs motion compensation on the motion information associated with the frames/compressed bit-stream. The CALC engine 622, during the encode mode, inversely quantizes the predicted frames and performs the inverse transformation on the result of inverse quantization. The CALC engine 622, during the decode mode, quantizes the compressed bit-stream and performs the transformation on the result of quantization.

The first dedicated buffer B1 636 stores at least one of the following parameters, but not limited to, a motion vector data and a set of interpolated reference pixels. Thus, the first dedicated buffer B1 636 provides a direct path for providing the parameters from the MC engine 624 to the CALC engine 622. Thus, the MC engine 624 is not required to load these parameters in the shared memory 608 and the CALC engine 622 is not required to read these parameters from the shared memory 608. This provides efficient utilization of the hardware accelerator engines.

The LPF engine 620 filters an output of the CALC engine 622 and is used for improving video quality.

The second dedicated buffer B2 632 stores at least one of the following parameters, but not limited to, a macro block parameters and a set of reconstructed pixels. Thus, the second dedicated buffer B2 632 provides a direct path for providing the parameters from the CALC engine 622 to the LPF engine 620. Thus, the CALC engine 622 is not required to load these parameters in the shared memory 608, and the LPF engine 620 is not required to read these parameters from the shared memory 608. This provides efficient utilization of the hardware accelerator engines.

The ME engine 614, during the encode mode, estimates motion information from a frame of the plurality of frames. The IPE engine 616, during the encode mode, generates a predicted frame for a current frame.

The third dedicated buffer B3 634 stores at least one of the following parameters, but not limited to, intra mode related parameters. Thus, the third dedicated buffer B3 634 provides a direct path for providing the parameters from the ME engine 614 to the IPE engine 616. Thus, the ME engine 614 is not required to load these parameters in the shared memory 608 and the IPE engine 616 is not required to read these parameters from the shared memory 608. This provides efficient utilization of the hardware accelerator engines.

The vDMA engine 602 directly provides the plurality of frames, encode attributes associated with each frame, the compressed bit-stream and decode attributes; from the shared memory 608 to the external memory 610 and vice-versa. The ECD engine 618, in encode mode, generates a preliminary compressed bit-stream and preliminary encode status. The preliminary compressed bit-stream and the preliminary encode status are further processed in the controller 612 to generate a compressed bit-stream and encode status.

The ECD engine 618, in decode mode, generates a preliminary frame and a preliminary decode status. The preliminary frame and the preliminary decode status are further processed in the controller 612 to generate a frame and an encode status.

The operation of the controller 612, the vDMA engine 602, the scrambler 605, the external memory 610 and the shared memory 608 in the video hardware engine 600 is similar to the explanation of these components in the video hardware engine 300, and hence is not explained for brevity of the description.

FIG. 7 is a block diagram illustrating a computing device 700, according to an embodiment. The computing device 700 is, or is incorporated into, a mobile communication device, such as a mobile phone, a personal digital assistant, a transceiver, a personal computer, or any other type of electronic system. The computing device 700 may include one or more additional components known to those skilled in the relevant art and are not discussed here for simplicity of the description.

In some embodiments, the computing device 700 comprises a megacell or a system-on-chip (SoC) which includes a processing unit 712 such as a CPU (Central Processing Unit), a memory module 714 (e.g., random access memory (RAM)) and a tester 710. The processing unit 712 can be, for example, a CISC-type (Complex Instruction Set Computer) CPU, RISC-type CPU (Reduced Instruction Set Computer), or a digital signal processor (DSP).

The memory module 714 (which can be memory such as RAM, flash memory, or disk storage) stores one or more software applications 730 (e.g., embedded applications) that, when executed by the processing unit 712, performs any suitable function associated with the computing device 700. The tester 710 comprises logic that supports testing and debugging of the computing device 700 executing the software applications 730.

For example, the tester 710 can be used to emulate a defective or unavailable component(s) of the computing device 700 to allow verification of how the component(s), were it actually present on the computing device 700, would perform in various situations (e.g., how the component(s) would interact with the software applications 730). In this way, the software applications 730 can be debugged in an environment which resembles post-production operation.

The processing unit 712 typically comprises memory and logic which store information frequently accessed from the memory module 714. A camera 718 is coupled to the processing unit 712. The computing device 700 includes a video processing unit 716. The video processing unit 716 is coupled to the processing unit 712 and the camera 718. The video processing unit 716 includes a video hardware engine 720. The video hardware engine 720 is similar to at least one of the video hardware engine 300 and the video hardware engine 600, in connection and operation. The image/video data shot by the camera 718 is processed in the video processing unit 716.

A scrambler in the video hardware engine 720 stores the plurality of blocks with M×M pixels in the shared memory. A video hardware accelerator unit in the video hardware engine 720 processes these blocks sequentially. The video hardware accelerator unit is not required to parse the pixels stored in the shared memory 308. This provides efficient utilization of the video hardware accelerator unit 304. The video hardware accelerator unit includes multiple hardware accelerator engines.

At least one dedicated buffer between two hardware accelerator engines increase efficiency of the video hardware accelerator unit. The video hardware engine 720 thus is able to provide 4K (ultra high-definition (HD)) resolution due to better utilization of the video hardware accelerator unit. Thus, video hardware engine 720 can be used in applications requiring high resolution such as cell phones, broadcast, set-top box, video conferencing, video surveillance, automotive etc.

FIG. 8 is an example environment in which various aspects of the present disclosure may be implemented. As shown, the environment may comprise, for example, one or more video cameras 810, computers 820, personal digital assistants (PDA) 830, mobile devices 840, televisions 850, video conference systems 860, video streaming systems 880, TV broadcasting systems 870 and communication networks/channels 890.

The video cameras 810 are configured to take continuous pictures and generate digital video, a signal comprising sequence of image frames. The video cameras 810 are configured to process the image frames for efficient storage and/or for transmission over the communication networks/channels 890. The computers 820, PDAs 830 and the mobile devices 840 are configured to encode the video signals for transmission and to decode encoded video signals received from the communication networks/channels 890.

The video streaming systems 880 is configured to encode video signal and to transmit the encoded video signals over the communication networks/channels 890 responsive to a received request and/or asynchronously. The television broadcasting systems 870 are configured to process video signals in accordance with one or more broadcast technologies and to broadcast the processed video signals over the communication networks/channels 890.

The video conference systems 860 are configured to receive a video signal from one or more participating/conferencing end-terminals (not shown) and to convert or compress the video signal for broadcasting or for transmitting to other participating user terminals. The television broadcasting systems 870 are configured to receive encoded video signals from one or more different broadcasting centers (or channels), to decode each video signal and to display the decoded video signals on a display device (not shown).

As shown in FIG. 8, the devices and systems 810-880 are coupled to communication networks/channels 890. Communication networks/channels 890 supports an exchange of video signal encoded in accordance with one or more video encoding standards such as, but not limited to, H. 283, H. 284/AEC, and HEVC (H. 286), for example. Accordingly, the devices and systems 810-880 are required to process (encode and/or decode) video signals complying with such standards.

The systems and devices 810-880 are implemented with one or more functional units that are configured to perform signal processing, transmitting and/or receiving of video signals from communication networks/channels 890. When each device in the described environment performs video encoding or decoding, one or more embodiments described in this disclosure are used.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections. The terms "inactivation" or "inactivated" or turn "OFF" or turned "OFF" is used to describe a deactivation of a device, a component or a signal. The terms "activation" or "activated" or turned "ON" describes activation of a device, a component or a signal.

Modifications are possible in the described embodiments, and other embodiments are possible, within the scope of the claims.

What is claimed is:

1. A video hardware engine comprising:
   a video hardware accelerator unit;
   a shared memory coupled to the video hardware accelerator unit, the shared memory being configured to store the plurality of blocks with M×M pixels received from a scrambler, and wherein the M×M pixels in the first block are linearly stored in the shared memory, the shared memory, while storing the first block, is configured to store M pixels in a first row of the first block followed by storing M pixels in a second row of the first block;
   the scrambler coupled to the shared memory;
   a vDMA (video direct memory access) engine coupled to the scrambler; and
   an external memory coupled to the vDMA engine, wherein the scrambler is configured to receive an LCU (largest coding unit) from the vDMA engine, wherein the LCU comprises N×N pixels, and the scrambler is configured to scramble N×N pixels in the LCU to generate a plurality of blocks with M×M pixels, where N and M are integers and M is less than N, and wherein the video hardware accelerator unit is configured to process the plurality of blocks to generate a plurality of processed blocks, each processed block of the plurality of processed blocks comprises M×M pixels.

2. The video hardware engine of claim 1, wherein the N×N pixels in the LCU are arranged in N rows and N columns, and the scrambler is configured to generate a first block of the plurality of blocks from pixels in first M rows and in first M columns of the LCU.

3. The video hardware engine of claim 1, wherein the shared memory is configured to linearly store a set of blocks of the plurality of blocks, and wherein the set of blocks is generated from the first M rows of the LCU.

4. The video hardware engine of claim 1, wherein the plurality of processed blocks are stored in the shared memory.

5. The video hardware engine of claim 1, wherein the scrambler is configured to receive the plurality of processed blocks from the shared memory, and configured to descramble the plurality of processed blocks to generate a processed LCU with N×N pixels.

6. A video hardware engine comprising:
   a video hardware accelerator unit;
   a shared memory coupled to the video hardware accelerator unit;
   a scrambler coupled to the shared memory;
   a vDMA (video direct memory access) engine coupled to the scrambler; and
   an external memory coupled to the vDMA engine, wherein the scrambler is configured to receive an LCU (largest coding unit) from the vDMA engine, wherein the LCU comprises N×N pixels, and the scrambler is configured to scramble N×N pixels in the LCU to generate a plurality of blocks with M×M pixels, where N and M are integers and M is less than N, and wherein the video hardware accelerator unit is configured to process the plurality of blocks to generate a plurality of processed blocks, each processed block of the plurality of processed blocks comprising M×M pixels, the video hardware accelerator unit comprising:
   a plurality of hardware accelerator engines; and
   at least one dedicated buffer coupled between a first and a second hardware accelerator engine of the plurality of hardware accelerator engines.

7. The video hardware engine of claim 6, wherein the plurality of hardware accelerator engines comprises a motion compensation engine, a transform and quantization engine, a motion estimation engine, a spatial intra prediction engine, a entropy codec engine, and a deblocking filter engine.

8. The video hardware engine of claim 6, wherein a first dedicated buffer between the motion compensation engine and the transform and quantization engine is configured to store at least one of a motion vector data and a set of interpolated reference pixels.

9. The video hardware engine of claim 6, wherein a second dedicated buffer between the transform and quantization engine and the deblocking filter engine is configured to store a macro block parameters and a set of reconstructed pixels.

10. The video hardware engine of claim 6, wherein a third dedicated buffer between the spatial intra prediction engine and the motion estimation engine is configured to store intra mode related parameters.

11. A method of processing a video data comprising:
    receiving the video data, the video data comprising an LCU (largest coding unit), the LCU further comprising N×N pixels arranged in N rows and N columns;
    scrambling N×N pixels in the LCU to generate a plurality of blocks with M×M pixels, where N and M are integers and M is less than N by processing the plurality of blocks in a video hardware accelerator unit, the video hardware accelerator unit comprises a plurality of hardware accelerator engines and providing an output of a first hardware accelerator engine directly as an input to a second hardware accelerator engine through a dedicated buffer, wherein the plurality of hardware accelerator engines comprises the first and the second hardware accelerator engines;
    storing linearly the plurality of blocks with M×M pixels in a shared memory; and
    processing the plurality of blocks to generate a plurality of processed blocks, each processed block of the plurality of processed blocks comprises M×M pixels.

12. A method of processing a video data comprising:
    receiving the video data, the video data comprising an LCU (largest coding unit), the LCU further comprising N×N pixels arranged in N rows and N columns;
    scrambling N×N pixels in the LCU to generate a plurality of blocks with M×M pixels, where N and M are integers and M is less than N;
    storing linearly the plurality of blocks with M×M pixels in a shared memory; and processing the plurality of blocks to generate a plurality of processed blocks, each processed block of the plurality of processed blocks comprises M×M pixels; and descrambling the plurality of processed blocks to generate a processed LCU with N×N pixels.

13. A computing device comprising:

a processing unit;

a memory module coupled to the processing unit; and a video processing unit coupled to the processing unit and the memory module, the video processing unit comprising a video hardware engine, the video hardware engine comprising:

a video hardware accelerator unit comprising a plurality of hardware accelerator engines; and at least one dedicated buffer coupled between a first and a second hardware accelerator engine of the plurality of hardware accelerator engines;

a shared memory coupled to the video hardware accelerator unit;

a scrambler coupled to the shared memory;

a vDMA (video direct memory access) engine coupled to the scrambler; and an external memory coupled to the vDMA engine, wherein the scrambler is configured to receive an LCU (largest coding unit) from the vDMA engine, wherein the LCU comprises N×N pixels, and the scrambler is configured to scramble N×N pixels in the LCU to generate a plurality of blocks with M×M pixels, where N and M are integers and M is less than N, and wherein the video hardware accelerator unit is configured to process the plurality of blocks to generate a plurality of processed blocks, each processed block of the plurality of processed blocks comprises M×M pixels.

\* \* \* \* \*